June 23, 1964     M. C. HENDRICKSON     3,138,763
MEASURING CIRCUIT FOR DETERMINING SIGNAL AMPLITUDE
Filed July 23, 1959
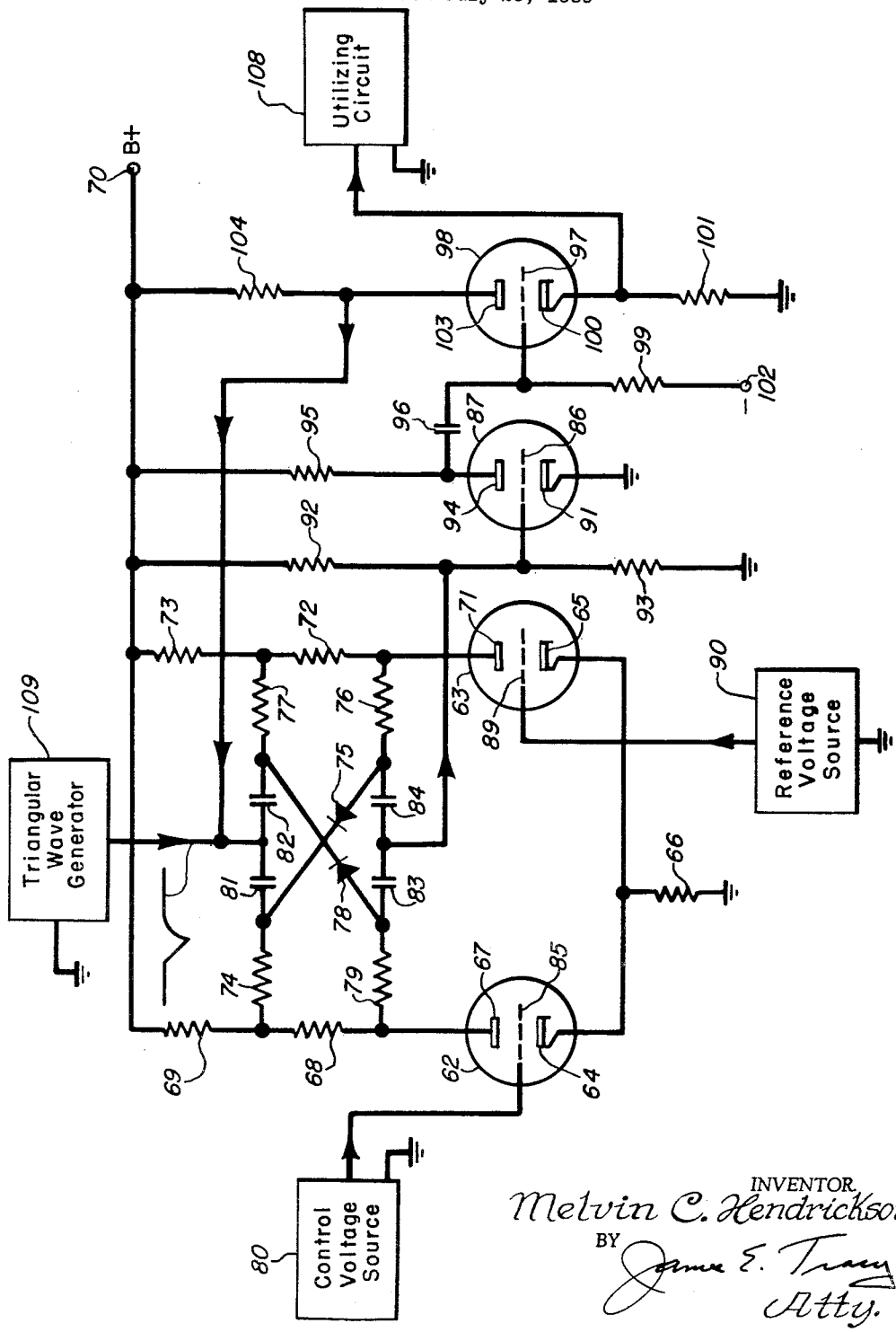
INVENTOR.
Melvin C. Hendrickson
BY James E. Tracy
Atty.

United States Patent Office 3,138,763
Patented June 23, 1964

3,138,763
MEASURING CIRCUIT FOR DETERMINING
SIGNAL AMPLITUDE
Melvin C. Hendrickson, Elmhurst, Ill., assignor to Zenith
Radio Corporation, a corporation of Delaware
Filed July 23, 1959, Ser. No. 829,105
7 Claims. (Cl. 328—150)

This invention relates in general to a novel measuring apparatus which finds utility in a variety of different fields.

Accordingly, it is an object of the present invention to provide a new and improved measuring apparatus.

It is a more specific object of the invention to provide a measuring apparatus for determining the absolute amplitude of a signal irrespective of its polarity.

A measuring apparatus, constructed in accordance with the invention, comprises a pair of unidirectional translating devices and means for normally biasing each of the devices to its non-conducting condition. There is a source of a first control effect of either polarity and having an unknown, fixed amplitude. Means are provided for effectively applying the first control effect to one of the unidirectional device with a polarity tending to render it conductive and to the other device with a polarity tending to maintain it non-conductive, the first control effect being insufficient by itself to establish the one device in its conductive condition. There is a source of a second control effect having, starting from a reference instant, a wave shape with a portion of gradual, relatively constant slope. Means are provided for effectively applying the second control effect to both of the unidirectional devices with a polarity tending to render them conductive, the one device only conducting and at a point along the gradual slope portion determined by the particular absolute amplitude of the first control effect. Finally, the measuring apparatus includes means responsive to the conduction of the one device for developing a signal pulse, the time separation between the reference instant and the signal pulse being inversely proportional to the absolute amplitude of the first control effect.

The measuring circuit is particularly useful as a threshold detector when incorporated in a code generator for producing a coded signal for a secrecy communication system. A code generator, including the measuring circuit of the present invention, is described in detail in copending application Serial No. 829,106, filed concurrently herewith, in the name of Herrmann et al., which has now matured as Patent 3,073,893, issued January 15, 1963, and assigned to the present assignee. Accordingly, reference may be made to Patent 3,073,893 for an explanation of one typical use to which the present invention may be applied.

The invention, together with further objects and advantages thereof, may best be understood, however, by reference to the following description in conjunction with the accompanying drawing which contains a schematic representation of a measuring apparatus constructed in accordance with the invention.

Turning now to a structural description of the illustrated measuring circuit, a pair of triodes 62, 63 are effectively interconnected to form a Class A operated push-pull amplifier. Specifically, cathode 64 of tube 62 and cathode 65 of triode 63 are connected together and through a cathode resistor 66 to a plane of reference potential, such as ground. Anode 67 is connected through a pair of series-connected resistors 68 and 69 to a source of B+ operating voltage 70, and anode 71 of tube 63 is also connected via a pair of series-connected resistors 72 and 73 to source 70.

The junction between resistors 68 and 69 is connected to anode 71 through a series connection comprising a resistor 74, a unidirectional device, such as a diode 75, and a resistor 76, the cathode of diode 75 being connected to resistor 74 and the anode to resistor 76. Similarly, the junction between resistors 72 and 73 is connected to anode 67 by means of a series circuit consisting of a resistor 77, a unidirectional device or diode 78 and a resistor 79, the cathode of diode 78 being connected to resistor 77 and the anode to resistor 79. The junction between resistor 74 and diode 75 is connected to the junction between resistor 77 and diode 78 by means of a pair of series-connected condensers 81, 82. In like manner, the junction between resistor 79 and diode 78 is coupled to the junction between diode 75 and resistor 76 via series-connected condensers 83 and 84. Since tubes 62 and 63 are operated as class A amplifiers, the resistance of resistors 68 and 72 is adjusted so that a voltage is normally impressed across each of diodes 78 and 75 sufficient to render them ordinarily cut off. Control grid 85 of triode 62 is connected to one output terminal of a control voltage source 80, the other output terminal of which is grounded. Source 80 is illustrated and described in complete detail in Patent 3,073,893, Herrmann et al., and provides a control effect (specifically, a control voltage) of either polarity and having an unknown, fixed amplitude. The junction between condensers 83 and 84 is connected to the control grid 86 of a triode 87 which serves as a pulse amplifier. Grid 89 of triode 63 is connected to one output terminal of a reference voltage source 90, whose other output terminal is connected to ground. Source 90 is illustrated and discussed in full detail in Patent 3,073,893 and provides a reference control effect (specifically, a reference control voltage) of either polarity and of fixed amplitude.

Cathode 91 of tube 87 is grounded and grid 86 is provided with a fixed positive bias with respect to cathode 91 by virtue of a voltage dividing arrangement comprising a pair of series-connected resistors 92 and 93 connected between source 70 of B+ operating voltage and ground, grid 86 being connected to the junction between the two resistors. The fixed bias is of such a magnitude to render tube 87 normally saturated. Anode 94 of triode 87 is connected to source 70 through a load resistor 95 and is also connected through a series-connected condenser 96 to the control grid 97 of a triode 98 which serves as a combination amplifier and phase inverter. Grid 97 is also connected to a source of negative bias potential 102 through a grid-leak return resistor 99 and cathode 100 is connected to ground through a resistor 101. Source 102 establishes grid 97 at a negative potential with respect to cathode 100 in order to render tube 98 normally cut off or non-conductive. Anode 103 of triode 98 is connected through a load resistor 104 to source 70 and cathode 100, which produces the output signal of the threshold detector or measuring circuit, is connected to one input of a utilizing circuit 108, the other input of which is grounded. The construction of circuitry 108 is fully described in Patent 3,073,893.

The junction between condensers 81 and 82 is connected to one output terminal of a triangular wave generator 109, the other output terminal being grounded. Generator 109, whose make-up is also fully explained in Patent 3,073,893, provides a control effect (specifically, a control voltage) having, starting from a reference instant, a negative-going trapezoidal or sawtooth waveshape with a portion of gradual, relatively constant slope, as illustrated by the waveform in the drawing.

In describing the operation of the illustrated measuring circuit, it will initially be assumed that the output voltage of source 90 is of zero amplitude. It will also be assumed that control voltage source 80 produces a D.C. control potential of positive polarity and of a predetermined amplitude level. This control potential is applied to control grid 85 of tube 62. Since triodes 62 and 63 are effectively cross-coupled by means of common cathode resistor 66 to form a push-pull amplifier, the control potential impressed on grid 85 is also applied to cathode 65 with the same polarity. This has the same effect as if the control potential were applied to grid 89 of tube 63 with opposite polarity. Thus, the D.C. control potential effectively is applied to tubes 62 and 63 in push-pull and the electron flow through load resistors 72 and 73 to source 70 is determined by the particular level of the control potential at any given instant, bearing in mind that reference voltage source 90 is ignored at this time and thus no potential is applied to grid 89.

The negative sloping sawtooth pulse produced by triangular wave generator 109 is applied to the junction between condensers 81 and 82 in order to slowly decrease (as compared to an instantaneous decrease) the potential on the cathodes of diodes 78 and 75. It will be remembered that diodes 78 and 75 are normally non-conductive because of the voltage developed across resistors 68 and 72, the anodes of the two diodes being negative with respect to their respective cathodes. Since the potential appearing on the anodes of normally cut off diodes 78 and 75 is dependent on the control potential from source 80, neither one of the diodes will conduct in response to the decreasing negative potential from generator 109 unless the control potential is of sufficient magnitude that it results in the establishment of a positive potential on the anode of one of the diodes with respect to the potential impressed on its cathode by the negative going sawtooth pulse. Of course, if during the interval of the sawtooth pulse the cathode of neither diode 78 or 75 is sufficiently negative with respect to its associated anode, neither diode will conduct. The sloping leading edge of the sawtooth pulse effectively provides a "sliding threshold." The circuit parameters of the threshold detector are adjusted so that the detector fires (namely, one of its two diodes conducts) only if the D.C. component or control potential from source 80 exceeds a predetermined magnitude.

To elucidate, when the potential impressed on grid 85 is positive, for example, the potential applied to cathode 65 will likewise be positive and thus tube 62 will have a greater flow of electrons than tube 63. The potential of anode 71 and thus that at the junction between resistors 72 and 73 will then be positive with respect to anode 67, and by the same token the potential at the junction between resistors 68 and 69 will be negative with respect to anode 71. Diode 78 is thus effectively biased to a further extent than is diode 75. However, assuming that the control potential exceeds the threshold amplitude, in response to the negative sloping sawtooth pulse the cathode of diode 75 reaches a potential level such that the diode conducts over the following path: condenser 81, diode 75, condenser 84, and resistor 93 to ground. This produces a negative pulse for application to grid 86. The point along the slope of the saw tooth pulse at which one of the diodes conducts is determined by the particular magnitude of the control potential from source 80.

If the control potential had been negative, diode 75 would be biased to a greater extent than diode 78 and thus diode 78 would conduct, over the following circuit: condenser 82, diode 78, condenser 83, and resistor 93 to ground. Thus, a negative pulse is produced across resistor 93 whether the control potential is positive or negative. It will be seen later, when reference voltage source 90 is considered, that the polarity of the applied control potential has a very definite effect on the operation of each threshold detector.

The pulse amplifier comprising triode 87 is normally biased to saturation by the voltage dividing action of resistors 92 and 93, as mentioned before, but the negative pulse developed across resistor 93 is sufficient to cut the pulse amplifier off and thus to develop a sharply defined positive pulse at anode 94 of tube 87. This pulse is then applied to grid 97 of triode 98 which is biased normally beyond cut-off by means of negative bias potential source 102. A negative pulse is thus developed at anode 103 and is combined with the concurrently occurring negative saw tooth pulse from generator 109 in order to increase the current flow through the particular conducting diode (either 75 or 78), and thus to increase the magnitude of the negative pulse developed across resistor 93. This is merely well known regenerative action which results in the production of a sharply defined pulse the instant one of diodes 75, 78 conducts or fires. The threshold detector may be designed so that the negative pulse developed at anode 103 is approximately twice the maximum amplitude of the saw tooth pulse.

The time constant of the coupling circuitry to triode 87 is adjusted to produce a pulse at cathode 100, once either diode 75 or 78 conducts, which is of predetermined duration for reasons explained in Patent 3,073,893. The output pulse is applied to and utilized in circuit 108 in a manner fully described in Patent 3,073,893.

As thus far described reference voltage source 90 has been ignored and the time separation between the beginning or reference instant of the sawtooth pulse and the development of a signal pulse across resistor 101 has been inversely proportional to the absolute amplitude of the control voltage from source 80. When reference voltage source 90 provides an output potential, the time separation is determined not only by the absolute amplitude of the control voltage but also by the amplitude and polarity of the reference voltage.

To illustrate, assume that the reference voltage from source 90 is negative two volts and assume further that the potential applied to grid 85 of the threshold detector is a positive one volt. The reference potential is applied to grid 89 as a negative two volts and because of the push-pull coupling arrangement this negative two volts is subjected to a polarity reversal at cathode 64 and is effectively subtracted in the threshold detector so that there will be a net potential of a negative one volt on grid 85 and the threshold detector will fire at a point along the sawtooth as determined by the net potential.

To summarize the invention to which the present application is directed, a measuring apparatus is disclosed for determining the absolute amplitude of a signal irrespective of its polarity. Diodes 75 and 78 constitute a pair of unidirectional translating devices. Amplifying devices or triodes 62 and 63, their load circuits, B+ source 70, and the coupling circuitry to diodes 75 and 78 collectively constitute means for normally biasing each of the unidirectional translating devices 75, 78 to its nonconducting condition. Source 80 is a source of a first control effect (specifically, a control voltage) of either polarity and having an unknown, fixed amplitude. This first control effect is effectively applied to one of unidirectional devices 75, 78 with a polarity tending to render it conductive and to the other of the devices with a polarity tending to maintain it non-conductive.

More particularly, the first control effect is applied to the input terminals of amplifying devices 62 and 63 in push-pull in order to decrease the current in one of the load circuits thereby decreasing the bias across one of unidirectional devices 75, 78 while at the same time increasing the current in the other of the load circuits to increase the bias across the other of the unidirectional devices. The first control effect by itself is insufficient to establish either one of the devices in its conductive condition.

Triangular wave generator 109 provides a source of a second control effect (specifically, a control voltage) having, starting from a reference instant, a wave shape with a portion of gradual, relatively constant slope. The wave shape may be trapezoidal, sawtooth, or the like, so long as a portion thereof exhibits a constant slope. Generator 109 is coupled to unidirectional devices 75 and 78, by way of condensers 81 and 82, with a polarity tending to render them conductive. The particular one of the diodes across which the bias has been decreased by the first control effect from source 80 conducts and this occurs at a point along the gradual slope portion determined by the particular absolute amplitude of said first control effect.

The circuitry coupled to the junction of condensers 83 and 84 provides means responsive to the conduction of one of the diodes for developing a signal pulse, the time separation between the reference instant and the signal pulse being inversely proportional to the absolute amplitude of the first control effect.

Considering the effect of a reference potential is applied to grid 89, one of unidirectional translating devices 75, 78 conducts at a point along the gradual slope portion of wave form D as determined not only by the amplitude and polarity of the first control effect but also by the amplitude and polarity of the reference voltage which may be considered as a reference control effect.

While a particular embodiment of the invention has been shown and described, modifications may be made, and it is intended in the appended claims to cover all such modifications as may fall within the true spirit and scope of the invention.

I claim:

1. Measuring apparatus for determining the absolute amplitude of a signal irrespective of its polarity, comprising: a pair of unidirectional translating devices; means for normally biasing each of said devices to its non-conducting condition; a source of a first control effect of either polarity and having an unknown, fixed amplitude; means for effectively applying said first control effect to one of said unidirectional devices with a polarity tending to render it conductive and to the other of said devices with a polarity tending to maintain it non-conductive, said first control effect being insufficient by itself to establish said one device in its conductive condition; a source of a second control effect having, starting from a reference instant, a wave shape with a portion of gradual, relatively constant slope; means for effectively applying said second control effect to both of said unidirectional devices with a polarity tending to render them conductive, said one device only conducting and such conduction occurring at a point along said gradual slope portion determined by the particular absolute amplitude of said first control effect; and means responsive to the conduction of said one device for developing a signal pulse, the time separation between said reference instant and said signal pulse being inversely proportional to the absolute amplitude of said first control effect.

2. Measuring apparatus for determining the absolute amplitude of a signal irrespective of its polarity, comprising: a pair of unidirectional translating devices; means for normally biasing each of said devices to its non-conducting condition; a source of a first control voltage of either polarity and having an unknown, fixed amplitude; means for effectively applying said first control voltage to one of said unidirectional devices with a polarity tending to render it conductive and to the other of said devices with a polarity tending to maintain it non-conductive, said first control voltage being insufficient by itself to establish said one device in its conductive condition; a source of a second control voltage having, starting from a reference instant, a trapezoidal wave shape with a portion of gradual, relatively constant slope; means for effectively applying said second control voltage to both of said unidirectional devices with a polarity tending to render them conductive, said one device only conducting and such conduction occurring at a point along said gradual slope portion determined by the particular absolute amplitude of said first control voltage; and means responsive to the conduction of said one device for developing a signal pulse, the time separation between said reference instant and said signal pulse being inversely proportional to the absolute amplitude of said first control voltage.

3. Measuring apparatus for determining the absolute amplitude of a signal irrespective of its polarity, comprising: a pair of diodes; means for normally biasing each of said diodes to its non-conductive condition; a source of a first control effect of either polarity and having an unknown, fixed amplitude; means for effectively applying said first control effect to one of said diodes with a polarity tending to render it conductive and to the other of said diodes with a polarity tending to maintain it non-conductive, said first control effect being insufficient by itself to establish said one diode in its conductive condition; a source of a second control effect having, starting from a reference instant, a sawtooth wave shape with a portion of gradual, relatively constant slope; means for effectively applying said second control effect to both of said diodes with a polarity tending to render them conductive, said one diode only conducting and such conduction occurring at a point along said gradual slope portion of said sawtooth wave shape determined by the particular absolute amplitude of said first control effect; and means responsive to the conduction of said one diode for developing a signal pulse, the time separation between said reference instant and said signal pulse being inversely proportional to the absolute amplitude of said first control effect.

4. Measuring apparatus for determining the absolute amplitude of a signal irrespective of its polarity, comprising: first and second amplifying devices; first and second load circuits for said first and second amplifying devices, respectively; means for rendering said amplifying devices conductive; first and second unidirectional translating devices coupled respectively to said first and second load circuits and normally biased to their non-conductive conditions; a source of a first control effect of either polarity and having an unknown, fixed amplitude; means for applying said first control effect to said first amplifying device with a polarity tending to render one of said unidirectional devices conductive and to the second amplifying device with a polarity tending to maintain the other unidirectional device non-conductive, said first control effect being insufficient by itself to establish said one unidirectional device in its conductive condition; a source of a second control effect having, starting from a reference instant, a wave shape with a portion of gradual, relatively constant slope; means for effectively applying said second control effect to both of said unidirectional devices with a polarity tending to render them conductive, said one unidirectional device only conducting and such conduction occurring at a point along said gradual slope portion determined by the particular absolute amplitude of said first control effect; and means responsive to the conduction of said one unidirectional device for developing a signal pulse, the time separation between said reference instant and said signal pulse being inversely proportional to the absolute amplitude of said first control effect.

5. Measuring apparatus for determining the absolute amplitude of a signal irrespective of its polarity, comprising: first and second amplifying devices; first and second load circuits for said first and second amplifying devices, respectively; at least one source of unidirectional potential for Class A operating said amplifying devices; first and second unidirectional translating devices each of which is cross-coupled between said first and second load circuits and each of which is normally biased to its non-conductive condition; a source of a first control effect of either polarity and having an unknown, fixed amplitude; means for effectively applying said first control effect to said first and second amplifying devices in push-pull in order to decrease the bias across one of said unidirectional devices while at the same time increasing the bias across the other, said first control effect being insufficient by itself to establish said one device in its conductive condition; a source of a second control effect having, starting from a reference instant, a wave shape with a portion of gradual, relatively constant slope; means for effectively applying said second control effect to both of said unidirectional devices with a polarity tending to render them conductive, said one unidirectional device only conducting and such conduction occurring at a point along said gradual slope portion determined by the particular absolute amplitude of said first control effect; and means responsive to the conduction of said one unidirectional device for developing a signal pulse, the time separation between said reference instant and said signal pulse being inversely proportional to the absolute amplitude of said first control effect.

6. Measuring apparatus for determining the absolute amplitude of a signal irrespective of its polarity, comprising: first and second amplifying devices each of which has an input terminal, an output terminal, and a common input-output terminal; first and second load circuits for said first and second amplifying devices, respectively; at least one source of unidirectional potential for Class A operating said amplifying devices such that substantially the same magnitude of current flows through each of said load circuits; first and second unidirectional translating devices each of which has a plate terminal and a cathode terminal; means coupling the plate terminal of said first unidirectional device to the output terminal of said first amplifying device and the cathode terminal of said first unidirectional device to said second load circuit, said first unidirectional device being normally biased to its non-conductive condition; means coupling the plate terminal of said second unidirectional device to the output terminal of said second amplifying device and the cathode terminal of said second unidirectional device to said first load circuit, said second unidirectional device being normally biased to its non-conductive condition; a source of a first control effect of either polarity and having an unknown, fixed amplitude; means for effectively applying said first control effect to the input terminals of said first and second amplifying devices in push-pull in order to decrease the current in one of said load circuits thereby decreasing the bias across one of said unidirectional devices while at the same time increasing the current in the other of said load circuits to increase the bias across the other of said unidirectional devices, said first control effect being insufficient by itself to establish said one unidirectional device in its conducting condition; a source of a second control effect having, starting from a reference instant, a wave shape with a portion of gradual, relatively constant slope; means for effectively applying said second control effect to both of said unidirectional devices with a polarity tending to render them conductive, said one unidirectional device only conducting and such conduction occurring at a point along said gradual slope portion determined by the particular absolute amplitude of said first control effect; and means responsive to the conduction of said one device for developing a signal pulse, the time separation between said reference instant and said signal pulse being inversely proportional to the absolute amplitude of said first control effect.

7. Measuring apparatus comprising: a pair of unidirectional translating devices; means for normally biasing each of said devices to its non-conducting condition; a source of a first control effect of either polarity and having an unknown, fixed amplitude; means for effectively applying said first control effect to one of said unidirectional devices with a polarity tending to render it conductive and to the other of said devices with a polarity tending to maintain it non-conductive, said first control effect being insufficient by itself to establish either one of said devices in its conducting condition; a source of a reference control effect of either polarity and having a fixed amplitude; means for effectively applying said reference control effect to one of said unidirectional devices with a polarity tending to render it conductive and to the other of said devices with a polarity tending to maintain it non-conductive, said reference control effect being insufficient by itself to establish either one of said devices in its conductive condition; a source of a second control effect having, starting from a reference instant, a wave shape with a portion of gradual, relatively constant slope; means for effectively applying said second control effect to both of said unidirectional devices with a polarity tending to render them conductive, one of said devices only conducting and such conduction occurring at a point along said gradual slope portion determined by the amplitudes and polarities of said first and reference control effects; and means responsive to the conduction of one of said unidirectional devices for developing a signal pulse.

References Cited in the file of this patent
UNITED STATES PATENTS

| | | |
|---|---|---|
| 2,684,443 | Tidball | July 20, 1954 |
| 2,840,706 | Crost | June 24, 1958 |
| 2,972,117 | Jarmotz et al. | Feb. 14, 1961 |